United States Patent
Graber et al.

(10) Patent No.: US 11,336,089 B2
(45) Date of Patent: May 17, 2022

(54) POWER CONDITIONING CIRCUIT

(71) Applicant: Pepperl+Fuchs SE, Mannheim (DE)

(72) Inventors: Steffen Graber, Mannheim (DE); Renato Kitchener, Mannheim (DE)

(73) Assignee: Pepperl + Fuchs SE, Mannheim (DE)

( * ) Notice: Subject to any disclaimer, the term of this patent is extended or adjusted under 35 U.S.C. 154(b) by 0 days.

(21) Appl. No.: 17/097,417

(22) Filed: Nov. 13, 2020

(65) Prior Publication Data

US 2021/0083472 A1  Mar. 18, 2021

Related U.S. Application Data

(63) Continuation of application No. PCT/EP2020/061061, filed on Apr. 21, 2020.

(30) Foreign Application Priority Data

May 31, 2019 (GB) .................................. 1907740
Jul. 9, 2019 (GB) .................................. 1909808

(Continued)

(51) Int. Cl.
  *H02J 1/10* (2006.01)
  *H04B 1/04* (2006.01)
  *H04B 1/16* (2006.01)

(52) U.S. Cl.
  CPC .................. *H02J 1/10* (2013.01); *H04B 1/04* (2013.01); *H04B 1/1607* (2013.01)

(58) Field of Classification Search
  CPC .......... H02J 1/10; H04B 1/04; H04B 1/1607; H04B 3/00; H02H 9/021
  See application file for complete search history.

(56) References Cited

U.S. PATENT DOCUMENTS

| | | | |
|---|---|---|---|
| 2007/0216390 A1* | 9/2007 | Wai | H02M 3/158 323/351 |
| 2008/0157891 A1* | 7/2008 | Tchamov | H03B 5/1228 331/117 R |

(Continued)

FOREIGN PATENT DOCUMENTS

| | | |
|---|---|---|
| CN | 101860206 A | 10/2010 |
| CN | 103904892 A | 7/2014 |
| EP | 1160965 A2 | 12/2001 |

OTHER PUBLICATIONS

PCT Notification of Transmittal of the International Search Report and Written Opinion of the International Searching Authority, or the Declaration n PCT/EP2020/061061, dated Jun. 17, 2020, 10 pages.

*Primary Examiner* — Jean B Corrielus
(74) *Attorney, Agent, or Firm* — Barley Snyder

(57) ABSTRACT

There is provided a power conditioning circuit including positive and negative power input nodes. An inductor includes a first terminal connected to a positive power input node and a second terminal connected to a positive power output node, the inductor allowing the voltage at the positive power output node to be modulated by data that is sent through a communication interface. A first node is present between the second terminal of the inductor and the positive power output node, and a clamping circuit is connected at the first node to a second node. The clamping circuit is configured to clamp a voltage increase across the inductor to less than a maximum increase. The second node is configured to be continuously held at a voltage higher than the voltage of the first terminal of the inductor.

19 Claims, 8 Drawing Sheets

(30) Foreign Application Priority Data

Jul. 9, 2019 (GB) .................................. 1909811
Oct. 14, 2019 (GB) .................................. 1914820

(56) References Cited

U.S. PATENT DOCUMENTS

| | | | | |
|---|---|---|---|---|
| 2010/0052601 A1* | 3/2010 | Pummer | ............... | H02P 23/26 |
| | | | | 318/812 |
| 2012/0139518 A1* | 6/2012 | Cleveland | ............ | H02M 3/157 |
| | | | | 323/283 |
| 2014/0055898 A1* | 2/2014 | Kostakis | ............... | H02H 3/025 |
| | | | | 361/91.5 |
| 2015/0342004 A1* | 11/2015 | Athalye | ............... | H02M 1/126 |
| | | | | 315/85 |
| 2015/0381075 A1* | 12/2015 | Qu | ................... | H02M 3/33576 |
| | | | | 363/132 |

* cited by examiner

POWER CONDITIONING CIRCUIT

CROSS-REFERENCE TO RELATED APPLICATIONS

This application is a continuation of PCT International Application No. PCT/EP2020/061061, filed on Apr. 21, 2020, which claims priority under 35 U.S.C. § 119 to Great Britain Patent Application No. 1907740.3, filed on May 31, 2019, Great Britain Patent Application No. 1909811.0, filed on Jul. 9, 2019, Great Britain Patent Application No. 1909808.6, filed on Jul. 9, 2019, and Great Britain Patent Application No. 1914820.4, filed on Oct. 14, 2019.

FIELD OF THE INVENTION

The present invention relates to a power conditioning circuit, for example for use in power supplies providing an intrinsically safe output for circuits located in explosive environments.

BACKGROUND

Circuits for use in explosive environments are subject to stringent requirements to ensure that they are intrinsically safe, and will not cause any sparking that could lead to fires or explosions. Various standards such as IEC 60079-11 lay down several requirements which circuits that are to be used in explosive environments must satisfy.

For compliance with these requirements, the power supplied to circuits in explosive environments must be restricted to non-incendive levels by using a power supply with a power conditioning circuit. The power conditioning circuit limits the power which can be supplied from a voltage source of limited voltage, by using a current-limiting resistor or an electronic current limiting circuit having a current set-point. The 'incendive-potential' relationship between the maximum open-circuit voltage output and the current follows a non-linear curve, and it will be appreciated that the higher the open circuit output voltage, the greater the resistance or the lower the current set-point of the electronic current limiting circuit needs to be.

Various digital communication standards such as Profibus PA, Foundation Fieldbus or Ethernet-APL allow transmission of data by modulating a voltage or current on top of the power supply output voltage, and so an inductor is normally required in series with the current limiting resistor or the electronic current limiting circuit of the power conditioner to increase the output impedance of the power supply and allow the desired modulation to take place.

However, the inductor is an energy storing device, where, for its given inductance, based on the normal operating currents or short circuit fault currents for this type of application, its potential 'fly-back' electromotive-force (back-emf), following a subsequent open circuit fault, can greatly exceed the nominal power supply output voltage and lead to ignition of gas (in air) or the detonation of dust. Therefore, there is a need to suppress the development of high voltages in the power supply output as a result of a sudden change to an open-circuit condition.

It is possible to use clamping diodes to suppress high voltages, for example the circuit shown in FIG. 1 has two or more clamping diodes Dc in series with one another, which are connected in parallel with the inductor L. These clamping diodes prevent the inductor L from causing the voltage at the power supply output 3 to rise too high above the voltage of the power supply U1 if an open-circuit fault occurs in a subsequent circuit connected to the power supply output 3. The resistor R2 limits the current that can be supplied to power supply output 3. The resistance R2 could be replaced by an electronic current limiting circuit instead if desired.

However, these clamping diodes Dc tend to either clip the data signals that are modulated onto the power supply output, or excessively increase the maximum open circuit voltage above the power supply voltage. Clipping of the data signals can be avoided by increasing the number of diodes connected in series, so that the diodes do not even approach their turn-on voltages during normal circuit operation. But, increasing the number of diodes connected in series increases the maximum open circuit voltage above the power supply voltage. Increasing the maximum open circuit voltage means that the resistance of the resistor R2 has to be increased or the current set-point of the electronic current limiting circuit reduced to keep the overall output power restricted to non-incendive levels. This results in more power being dissipated within the resistor or electronic current limiting circuit and less current being supplied during normal operation, which is undesirable. Alternatively, decreasing the power supply voltage so the maximum open circuit voltage remains the same and the resistor or set-point of the electronic current limiting circuit do not need to be changed, has the effect of reducing the power that the power supply is able to deliver to the circuit.

It is therefore an object of the invention to provide an improved power conditioning circuit.

SUMMARY

According to a first aspect of the invention, there is provided a power conditioning circuit comprising positive and negative power input nodes for connecting to positive and negative outputs of a power supply; positive and negative power output nodes for connecting to positive and negative lines of a communication interface; and an inductor connected in series between the positive power input node and the positive power output node. The inductor comprises a first terminal connected to the positive power input node and a second terminal connected to the positive power output node, the inductor for allowing the voltage at the positive power output node to be modulated by data that is sent through the communication interface. The power conditioning circuit further comprises a first node between the second terminal of the inductor and the positive power output node; and a clamping circuit connected at the first node to a second node, wherein the clamping circuit is configured to clamp a voltage increase across the inductor to less than a maximum increase, and wherein the second node is configured to be continuously held at a voltage higher than the voltage of the first terminal of the inductor. Preferably, the clamping circuit comprises one or more components implementing a diode function that is forwardly biased in a direction from the first node to the second node.

The voltage increase is an increase in the voltage of the second terminal of the inductor above that of the first terminal of the inductor. Since the second node is held at a higher voltage than the first terminal of the inductor, the clamping circuit is able to clamp a voltage increase across the inductor to less than a maximum increase, without needing to accommodate the whole of that increase across the clamping circuit. Part of the increase is accommodated by the higher voltage of the second node in comparison to the first terminal of the inductor.

Therefore, the clamping circuit may for example only have one diode connected in parallel with the inductor, instead of the two diodes Dc shown in FIG. 1. Since only one diode is needed, there is less variance in dynamic impedance of the clamping circuit in comparison to using two diodes in series, and so a higher quality modulated signal can be maintained at the positive power output node. The one diode may comprise one semiconductor junction, or more than one semiconductor junction where all those semiconductor junctions are connected in parallel with one another so that the one diode can have a higher current handling capability. Therefore, in either case the one diode has a turn-on voltage corresponding to that of a single semiconductor junction (e.g. a single PN junction).

The clamping of the voltage increase across the inductor to less than a maximum increase means the clamping circuit prevents the voltage increase across the inductor from rising as high as it would if the clamping circuit were not present. The voltage increase typically occurs upon a sudden open-circuit in the load, when the collapsing magnetic field of the inductor drives the inductor terminals to a high voltage unless the clamping circuit is present to provide a path for the excess energy released from the inductor.

The higher voltage at the second node in comparison to the voltage at the first terminal of the inductor also contributes toward preventing clipping of the voltage modulation on the positive power output node.

The second node is configured to be continuously held at a voltage higher than the first terminal of the inductor, and this voltage is preferably a fixed voltage. This voltage may for example be fixed by a voltage source, or by a voltage regulating component such as a diode that is always biased in a fully turned on state during normal circuit operation.

The voltage of the second node may be fixed higher than the voltage of the first terminal of the inductor, by the second node being a further positive power input node for connecting to a power supply output of higher voltage than the voltage connected to the positive power input node.

The voltage of the second node may alternatively be fixed higher than the voltage of the first terminal of the inductor, by the second node being the positive power input node, and the clamping circuit comprising a voltage regulating component that is connected in series between the positive power input node and the first terminal of the inductor. The voltage regulating component may for example be a diode that is connected in forward bias in a direction from the positive power input node to the first terminal of the inductor, wherein the diode is fully turned on when supplying current during the normal operation of the circuit, so that the changes in its impedance as a result of the voltage modulation of the positive power output node will be minimal. The voltage regulating component may alternatively be a voltage regulator that regulates the difference in voltage between the positive power input node and the first terminal of the inductor.

To help limit the current that can be driven by the inductor, a resistor may be connected in series with the inductor between the positive power input and positive power output nodes. The resistor is preferably an infallible resistor, meaning that it cannot fail to present a resistance of at least its rated value.

The power conditioning circuit may also comprise a further inductor connected in series between the first node and the positive power output node, wherein the further inductor has a lower inductance than the inductor. Since the further inductor is smaller than the inductor, it does not store as much energy for release if an open-circuit condition occurs, and so it does not require any specific clamping arrangements to be made for it. This is advantageous, because the further inductor adds to the output impedance of the positive power output node and allows modulation of the voltage on the positive power output node at a frequency corresponding to the symbol rate of the data, without the requirement for any clamping arrangements that could clip the modulation. The inductor and the associated clamping circuit allow lower frequency modulation of the voltage on the positive power output node, for example frequencies that are less than half of the symbol rate of the data. Due to the further inductor, the clamping circuit associated with the inductor can be simplified, since the clamping circuit is much less likely to clip the voltage modulation on the positive power output node when the positive power input node is partially isolated from the clamping circuit by the further inductor.

The clamping circuit may comprise a clamping diode connected in parallel with the inductor between the positive power input node and the first node, the clamping diode being connected in forward bias in a direction from the first node to the positive power input node. Then, if an open circuit fault occurs between the positive and negative lines of the communication interface, the diode conducts in forward bias to clamp the voltage increase across the inductor that results from the collapsing magnetic field of the inductor. The clamping circuit may comprise a Zener diode connected between the first node and the negative power output node, and connected in forward bias in a direction from the negative power output node. That is, with the cathode connected to the first node and the anode connected to the negative power output node second node. The Zener diode may be formed of more than one Zener diode connected in parallel, to provide redundancy.

A typical failure mode on the communication interface is a transient short-circuit between the positive and negative lines, followed by an open circuit. The power conditioning circuit may comprise a protection diode connected in parallel with the inductor between the positive power input node and the first node, the diode being connected in forward bias in a direction from the positive power input node to the first node. The protection diode does not have any direct impact on the maximum voltage that can appear on the positive power output node, however it means that if a transient short-circuit occurs followed by an open-circuit fault, during the transient short-circuit the short-circuit current will preferentially flow through the protection diode rather than the inductor, building up less energy in the inductor for release when the open-circuit occurs. To avoid any clipping of the negative peak of the voltage modulation on the positive power output node, the protection diode may be formed from two diodes connected in series with one another. Then, if each individual diode has a forward turn-on voltage of at least 0.4V, there is no risk of signal clipping occurring unless the negative peak of the voltage modulation at the positive power output node is more than 0.8V below the voltage at the positive power input node.

The clamping circuit may also comprise a pair of transistors that are connected in parallel with the inductor between the positive power input node and the first node, wherein a biasing input of the pair of transistors is connected to the first node via a biasing network. The pair of transistors may be configured as a Darlington pair of transistors, but are preferably configured as a Sziklai pair of transistors due to the lower turn-on voltage of a Sziklai pair compared to a Darlington pair, meaning the maximum open circuit voltage for the purposes of intrinsic safety, the so-called certification or safety maximum voltage Uo, can be lower. The pair of transistors turns on when the voltage at the first node rises due to the collapsing magnetic field of the inductor when an open circuit fault occurs between the positive and negative lines of the communication interface. This turning on of the pair of transistors provides a low impedance path across the inductor that limits the rise in voltage at the first node, in effect returning the energy from the inductor back to the power supply. The protection diode is particularly helpful when the pair of transistors is used, since it helps to protect the emitter voltage from rising too high above the base voltage of the input transistor of the pair.

The use of a pair of transistors in a Darlington or Sziklai configuration, rather than just relying on a diode, significantly improves the performance of the power conditioning circuit. This is because the forward conduction voltage of a diode, i.e. the forward voltage at which the diode turns on and begins conducting, changes significantly with temperature. The forward conduction voltage across a diode increases as the temperature decreases, and so a diode connected in parallel to the input terminals of the inductor will be less effective at restricting the voltage at the first node under an open circuit fault at lower temperatures than it would be at higher temperatures. Therefore, the maximum open circuit voltage for the purposes of intrinsic safety needs to be set higher than it would need to be if the temperature variance of the diode was more limited. It is not possible to simply use a diode with a lower forward conduction voltage, because then the diode will tend to clip the modulation of the positive power input node by the data symbols on the communication interface and lead to distortion, particularly at higher temperatures where the forward conduction voltage is lower.

Furthermore, the transition from forward 'non-conductance' to 'conductance' (the knee) to overcome the depletion layer of the diode is not instantaneous or 'sharp', and depending on the specific type of diode used there may be a degree of 'semiconductance' when approaching and passing the forward conduction voltage at which the diode turns on. This means a decrease in impedance will occur at a lower voltage than the certification voltage, which will lead to signal distortion, even if the diode has a lower voltage applied across it than the forward conduction voltage, and which progressively worsens with an increase in temperature. Another issue is the forward voltage variation under differing currents, where the forward voltage increases with an increase in current.

Selecting a diode for production that has a high reverse bias impedance or a very low parasitic capacitance, a 'cliff-edge' forward voltage conductance threshold (the knee) and a very narrow forward conduction voltage variation under a wide temperature variation, is very difficult, if not impossible, or the diode would prove to be too expensive to be practical.

The Darlington or Sziklai pair of transistors provide a sharper transition between the conducting and non-conducting states than a diode, preventing signal distortion as the voltage modulation of the positive power output node causes the voltage at the biasing input to move towards the turn-on voltage of the transistors, and meaning that the certification voltage does not need to be specified much above the nominal turn-on voltage of the transistors.

The biasing network may comprise a voltage divider of at least two resistors connected in series with one another, the voltage divider being connected in parallel with the inductor, and wherein the biasing input of the pair of transistors is connected at a node between the resistors of the at least two resistors. The resistance values of the resistors of the voltage divider can then be set so that the pair of transistors will turn on once a threshold voltage appears across the inductor, as may occur during an open-circuit fault. The threshold voltage is set to be higher than the maximum voltage that can appear over the inductor during normal operating conditions, the voltage appearing over the inductor during normal operating conditions being due to the voltage modulation of the positive power output node by the data symbols on the communication interface.

The at least two resistors of the biasing network preferably comprise resistors having temperature coefficients that compensate for temperature variations so that the voltage across the inductor that is required for the pair of transistors to turn on will remain substantially constant as the temperature of the circuit varies, for example between 0° C. and 40° C. The problems that occur due to variations in diode characteristics with temperature are therefore substantially eliminated by the use of the pair of transistors with the temperature-compensated biasing network.

The biasing input of the pair of transistors will typically be associated with some parasitic capacitance that takes a short time to charge up through the voltage divider when the voltage across the inductor rises. Therefore, the biasing network may also comprise a capacitor that connects the biasing input of the Sziklai pair to the first node, so that an increase in voltage at the first node immediately increases the voltage at the biasing input.

The components of the power conditioning circuit described above that are connected to the positive power input node and the positive power output node may be mirrored by equivalent components of the same values (e.g. of resistance, inductance, and/or capacitance) connected to the negative power input node and the negative power output node, to form a balanced circuit for differential voltage signalling over the positive and negative lines of the communication interface. Specifically, a second inductor may be connected in series between the negative power input node and the negative power output node, the second inductor comprising a first terminal connected to the negative power input node and a second terminal connected to the negative power output node, and for allowing the voltage at the negative power output node to be modulated by the communication interface. Preferably, the first inductor and the second inductor are wound around a same core as one another to aid the symmetrical operation of the differential voltage signalling. The core may for example be a ferrite core, or an air core.

A second resistor may be connected in series between the second inductor and the negative power output node, the second resistor for limiting the current that can be drawn by the inductor from the negative power output node. The second resistor is preferably an infallible resistor, meaning that it cannot fail to present a resistance of at least its rated value.

A second clamping circuit may be connected at first negative node between the second inductor and the negative power output node, to a second negative node, wherein the second clamping circuit is configured to clamp a voltage decrease across the inductor to less than a maximum decrease. A further second inductor may be connected in series between the first negative node and the negative power output node, wherein the further second inductor has a lower inductance than the second inductor, and wherein the second negative node is configured to be continuously held at a voltage lower than the first terminal of the second inductor.

The second clamping circuit may be the same as the first clamping circuit described above, for example the second clamping circuit may comprise a second protection diode connected in parallel with the second inductor, the second protection diode being connected in forward bias in a direction from the first negative node to the negative power input node. The second clamping circuit may comprise a second clamping diode connected in parallel with the second inductor, the second clamping diode being connected in forward bias in a direction from the negative power input node to the first negative node. The second clamping circuit may comprise a second pair of transistors that are connected in parallel with the second inductor in either a Sziklai or Darlington configuration, wherein a second biasing input of the second pair of transistors is connected to the first negative node via a second biasing network.

The second biasing network may comprise a second voltage divider of at least two resistors connected in series with one another, the second voltage divider being connected in parallel with the second inductor, and wherein the second biasing input of the second pair of transistors is connected at a node between the resistors of the at least two resistors forming the second voltage divider. The at least two resistors of the second biasing network may comprise resistors having temperature coefficients that compensate for temperature variations so that the voltage across the second inductor that is required for the second pair of transistors to turn on will remain substantially constant as the temperature of the circuit varies. The second biasing network may comprise a second capacitor that connects the second biasing input of the second pair of transistors to the second negative node.

The second negative node may be clamped to a lower voltage than the first terminal of the second inductor, for example by the second negative node being the negative power input node and the second clamping circuit comprising a second voltage regulating component that is connected in series between the negative power input node and the first terminal of the second inductor, or the second negative node may be a further negative power input node for connecting to a power supply output of lower voltage than the voltage connected to the negative power input node. The second voltage regulating component may be a diode connected in forward bias in a direction from the first terminal of the second inductor to the negative power input node.

According to a second aspect of the invention, there is provided a power supply system comprising the above-described power conditioning circuit. The power supply system comprises a power supply with positive and negative outputs connected to the positive and negative power input nodes of the power conditioning circuit, and if the power conditioning circuit comprises the further positive and further negative power input nodes, then the power supply system further comprises a further power supply with positive and negative outputs connected to the further positive and further negative power input nodes of the power conditioning circuit. The further positive output of the second power supply is configured to output a higher voltage than the positive output of the first power supply, and the further negative output of the second power supply is configured to output a lower voltage than the negative output of the first power supply. This configuration may be used to clamp the second negative node to a lower voltage than the first terminal of the second inductor.

The power supply and the further power supply are preferably connected to a common ground or 0V reference potential. The further power supply may be an intrinsically safe, voltage clamped power sink, comprising two intrinsically safe voltage clamped power sinks in series, each one connected to a respective one of the clamping diodes, and with a centre-tap ground or fixed reference point connected to the common ground or 0V reference potential.

According to a third aspect of the invention, there is provided a communication system comprising the above-described power supply system, a communication interface having positive and negative lines connected to the positive and negative power output nodes of the power conditioning circuit, respectively, and a transmitter connected to the positive and negative lines of the communication interface, the transmitter configured to transmit data symbols by modulating voltages of the positive and negative lines of the communication interface.

The communication system may also comprise a receiver connected to the positive and negative lines of the communication interface, wherein the receiver is configured to draw power from the positive and negative lines of the communication interface to power the receiver to decode the data symbols transmitted on the communication interface by the transmitter. Due in part to the power conditioning circuit which may be specified to keep the power supplied down to non-incendive levels in accordance with IEC 60079-11 (Edition 6, July 2011), the communication interface and the receiver may be placed inside explosive environments.

According to another aspect of the invention, there is provided a power conditioning circuit comprising: positive and negative power input nodes for connecting to positive and negative outputs of a power supply; positive and negative power output nodes for connecting to positive and negative lines of a communication interface; an inductor connected in series between the positive power input node and the positive power output node, the inductor comprising a first terminal connected to the positive power input node and a second terminal connected to the positive power output node, the inductor for allowing the voltage at the positive power output node to be modulated by data that is sent through the communication interface; a first node between the second terminal of the inductor and the positive power output node; a second node between the positive power input node and the first terminal of the inductor; and a clamping circuit comprising a pair of transistors that are connected in parallel with the inductor between the first and second nodes, the pair of transistors being in either a Sziklai or Darlington configuration, wherein a biasing input of the pair of transistors is connected to the first node via a biasing network.

The pair of transistors of the clamping circuit may be configured in the same manner as the pairs of transistors of the above-described aspects of the invention. The transistors provide a more effective clamping circuit which acts like a diode but has a sharper turn-on characteristic.

According to still another aspect of the invention, there is provided a power conditioning circuit comprising: positive and negative power input nodes for connecting to positive and negative outputs of a power supply; positive and negative power output nodes for connecting to positive and negative lines of a communication interface; an inductor and a further inductor connected in series with one another between the positive power input node and the positive power output node; a first node at the series connection between the inductors, the inductor connected between the positive power input node and the first node, and the further inductor connected between the first node and the positive power output node; and a clamping circuit connected to the first node and configured to clamp a voltage increase across the inductor to less than a maximum increase. The further inductor has a lower inductance than the inductor, and the further inductor remains unclamped.

The further inductor may be configured in the same manner as in the above-described aspects of the invention, and allows the higher frequency components of the voltage modulation to be partially isolated from the clamping circuit, therefore reducing distortion of the voltage modulation.

BRIEF DESCRIPTION OF THE DRAWINGS

Embodiments of the invention will now be described by way of non-limiting example only and with reference to the accompanying drawings, in which:

FIG. 5b shows a schematic diagram of a power supply system including a power conditioning circuit similar to that of FIG. 5a;

FIG. 6b shows a schematic diagram of a power supply system including a power conditioning circuit similar to that of FIG. 6a;

FIG. 7b shows a schematic diagram of a power supply system including a power conditioning circuit similar to that of FIG. 7a;

FIG. 8b shows a schematic diagram of a power supply system including a power conditioning circuit similar to that of FIG. 8a.

DETAILED DESCRIPTION OF THE EMBODIMENT(S)

The figures are not to scale, and same or similar reference signs denote same or similar features.

Figure 2:
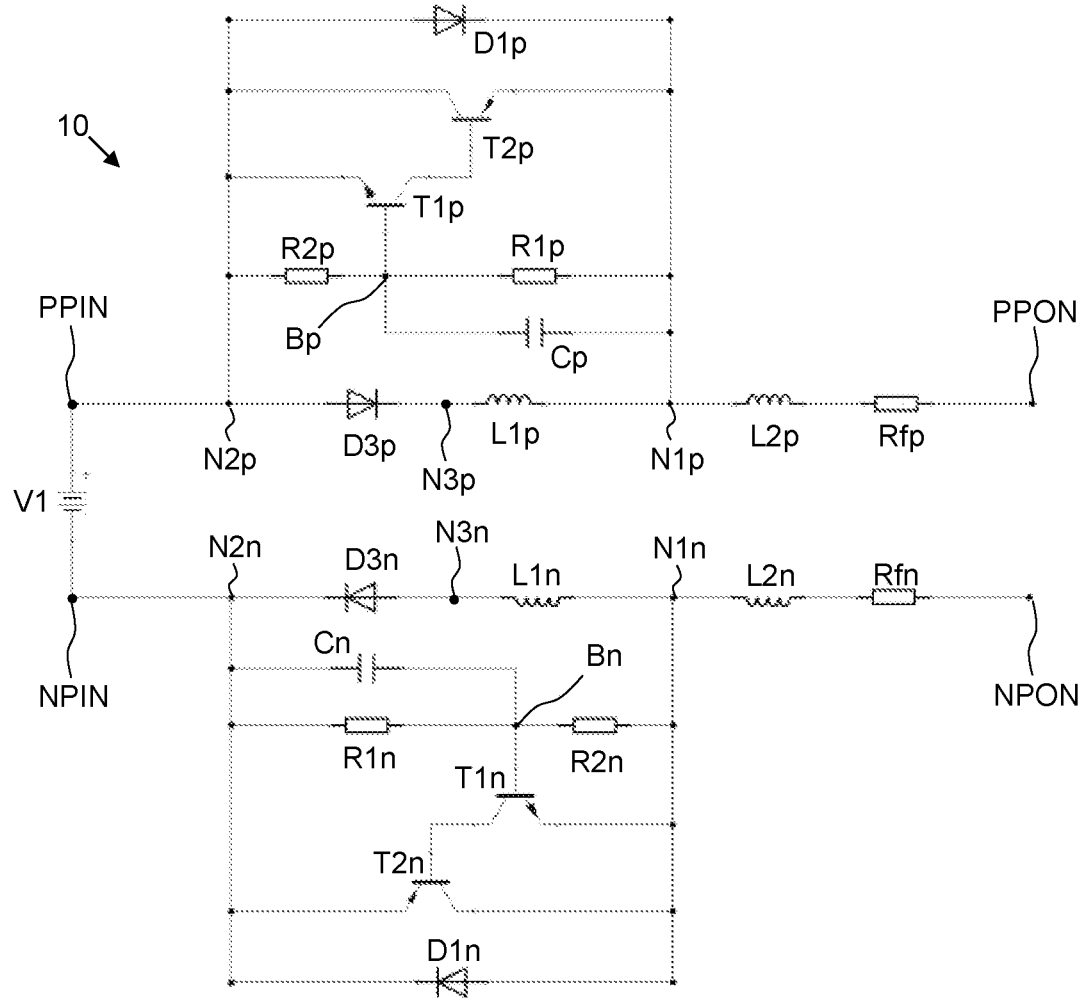
FIG. 2 shows a schematic diagram of a power supply system including a power conditioning circuit in accordance with a first embodiment of the invention.

A first embodiment will now be described with reference to FIG. 2. FIG. 2 shows a power conditioning circuit 10 connected to a power supply V1. The power conditioning circuit has a positive power input node PPIN and a negative power input node NPIN, and these nodes are connected to positive and negative terminals of the power supply V1. The power conditioning circuit also has a positive power output node PPON and a negative power output node NPON. The power conditioning circuit 10 receives power from the power supply V1, which is treated as an ideal voltage source, and conditions the power for output at the positive and negative power output nodes PPON and NPON.

Due to the conditioning of the power that is performed by the power conditioning circuit 10, it is possible to modulate data symbols upon the power output, which appears as fluctuations in the voltages at nodes PPON and NPON. Specifically, referring to the positive side of the power conditioning circuit 10, the circuit comprises an inductor $L1p$ and a resistor Rfp connected in series with one another between nodes PPIN and PPON. A first node $N1p$ exists between the inductor $L1p$ and the resistor Rfp. The resistor Rfp is an infallible resistor which limits the current that can be delivered to the output node PPON, and the inductor $L1p$ allows the voltage at the output node PPON to fluctuate with modulation of data symbols despite the ideal voltage source V1.

The same circuit configuration appears in the negative side of the power conditioning circuit 10, with the inductor $L1n$ and a resistor Rfn connected in series with one another between nodes NPIN and NPON. A first node $N1n$ exists between the inductor $L1n$ and the resistor Rfn. In this embodiment, the positive and negative sides of the circuit are configured the same as one another to form a balanced circuit, however this does not always have to be the case. The inductor $L1p$ and the inductor $L1n$ are each defined by coil windings, the coil windings of the inductor $L1p$ and the coil windings of the inductor $L1n$ are both wound around a same core as one another.

In this embodiment, a further inductor $L2p$ is connected in series between the first node $N1p$ and the resistor RfP. Similarly, a further inductor $L2n$ is also connected in series between the first node $N1n$ and the resistor Rfn, at the negative side of the circuit. The further inductors $L2p$ and $L2n$ have smaller values of inductance than the inductances of $L1p$ and $L1n$, and so they do not require any voltage clamping to guard against a sudden discharge of the energy stored in their magnetic field. They are however large enough to filter out high frequency fluctuations in the voltages at nodes PPON and NPON, for example frequencies similar to those of the symbol rate at which the voltages at PPON and NPON are modulated.

The inductors $L1p$ and $L1n$ are larger than $L2p$ and $L2n$, and so also filter out lower frequency fluctuations in the voltage at PPON. The inductors $L1p$ and $L1n$ are each provided with a clamping circuit to clamp a voltage increase across each inductor to less than a maximum increase. Then, if the current flowing through $L2p$ and $L2n$ suddenly drops to zero, for example as a result of an open-circuit fault in a circuit being powered by the power conditioning circuit 10, the clamping circuits will operate to prevent the energy released from those inductors from driving the first nodes $N1p$ and $N1n$ to high voltage magnitudes.

The clamping circuit on the positive side is connected at the first node $N1p$ to a second node $N2p$, which corresponds to the positive power supply input node PPIN. The clamping circuit comprises a protection diode $D1p$ and a Sziklai pair of transistors $T1p$ and $T2p$ which are controlled by a biasing input Bp from a biasing network. The biasing network is formed of a voltage divider defined by two resistors $R1p$ and $R2p$, and a capacitor Cp.

The two resistors $R1p$ and $R2p$ are connected in series with one another between the first and second nodes $N1p$ and $N2p$, with the biasing input Bp defined between those resistors. The capacitor Cp is connected between the biasing input Bp and the first node $N1p$, in parallel with the resistor $R1p$. The biasing input Bp is connected to the base of the NPN transistor $T1p$, and the collector of the transistor $T1p$ is connected to the base of the PNP transistor T2$p$, to form the Sziklai pair, as will be apparent to those skilled in the art.

The biasing network is connected in parallel with the inductor L1$p$, and so responds to the voltage across the inductor L1P. Specifically, if the voltage at the first node N1$p$ rises too high, then the biasing network turns on the transistor T1$p$, which turns on the transistor T2$p$, thereby clamping the voltage at the first node N1$p$ down towards the voltage at the second node N2$p$. The Sziklai pair of transistors T1$p$ and T2$p$ could be replaced by a Darlington pair of transistors if desired, which would require a higher voltage at the biasing input to turn the transistors on. Sziklai pairs also have the advantages of good linearity and more importantly, bandwidth, which can mean that they react in a faster way, more suited for intrinsically safe applications.

The reaction time of the Sziklai pair is further improved by the optional capacitor Cp, which has a very low impedance at high frequency, and therefore the initial base current into the input transistor T1$p$ can be very high. The capacitor Cp can also overcome some of the parasitic base-emitter/collector capacitances of the input transistor Tp1, although these will be relatively low, due to the Sziklai pair's high trans-impedance characteristic in this circuit.

The Sziklai pair of transistors T1$p$ and T2$p$ have a negative temperature co-efficient, in that the warmer the temperature, the lower the voltage at the biasing input Bp needs to be in order for the transistors to turn on. Therefore, the two resistors R1$p$ and R2$p$ have temperature coefficients which cause the voltage at the biasing input to fall as the temperature increases, thereby compensating for the temperature variation. In this embodiment, the resistor R1$p$ has a positive temperature co-efficient so that its resistance increases with temperature, lowering the voltage at the biasing input Bp. The resistors R1$p$ and R2$p$ may alternatively comprise negative and/or positive thermistor type resistors (NTC/PTC resistors) or additional thermistors (not shown) that can compensate for temperature variations of the base-emitter voltages of the input transistor T1$p$, under temperature variations, so that the input transistor T1$p$ will activate at the same or a similar voltage across the inductor, at high and low operating ambient temperatures. The biasing network defined by two resistors R1$p$, R2$p$ and the capacitor Cp are high enough in resistance/impedance such that data communications modulated on the positive power output node PPON are not adversely affected, and low enough in resistance/impedance to control the transistors T1$p$ and T2$p$ in a fast or accurate way, which due to the high current gain of the Sziklai pair, is achievable.

The protection diode D1$p$ is connected in parallel with the inductor L1$p$, between the first and second nodes N1$p$ and N2$p$. The protection diode is forward biased in a direction from the second node N2$p$ to the first node N1$p$, and limits the amount of energy stored in the inductor L1$p$ if a short circuit occurs in the circuit connected to the output of the power conditioning circuit 10. Specifically, if there is a short circuit between the output nodes PPON and NPON, then the voltage at the first node N1$p$ will fall below the voltage at the second node N2$p$ by the forward conduction voltage of the diode D1$p$. The diode D1$p$ will conduct to prevent the voltage at the first node N1$p$ from falling below the voltage at the second node by significantly more than the forward conduction voltage of the diode D1$p$, thereby limiting the voltage that can appear across the inductor L1$p$, and so limiting the current that flows through the inductor L1$p$ and the energy that is stored. Since less energy is stored, there is less energy available for sudden release when the short-circuit is followed by an open-circuit fault, e.g. due to a fuse blowing or circuit breaker activating. The diode D1$p$ has a forward conduction voltage that is significantly higher than the forward conduction voltage of the diode D3$p$, to avoid D1$p$ shorting the voltage across the inductor L1$p$. For example, the diode D1$p$ may be formed by at least one more PN junction connected in series than the diode D3$p$ is formed from, or the diodes D1$p$ and D3$p$ may be different types to one another.

The clamping circuit on the negative side is connected at the first node N1$n$ to a second node N2$n$, which corresponds to the negative power supply input node NPIN. The clamping circuit on the negative side is the same as the clamping circuit on the positive side, to provide a balanced circuit. The clamping circuit comprises a protection diode D1$n$ and a Sziklai pair of transistors T1$n$ and T2$n$ which are controlled by a biasing input Bn from a biasing network. These all operate in the same manner as the protection diode D1$p$ and the Sziklai pair of transistors T1$p$ and T2$p$ of the clamping circuit on the positive side.

The biasing network is formed of a voltage divider defined by two resistors R1$n$ and R2$n$, and a capacitor Cn. The two resistors R1$n$ and R2$n$ are connected in series with one another between the first and second nodes N1$n$ and N2$n$, with the biasing input defined between those resistors. The capacitor Cn is connected between the biasing input Bn and the second node N2$n$, in parallel with the resistor R2$n$. The biasing network is connected in parallel with the inductor L1$n$.

The protection diode D1$n$ is connected in parallel with the inductor L1$n$, between the first and second nodes N1$n$ and N2$n$. The protection diode is forward biased in a direction from the first node N1$n$ to the second node N2$n$, and operates in the same way as the protection diode D1$p$.

The certification voltage, corresponding to the highest open-loop voltage that can be output from the power conditioning circuit at nodes PPON and NPON, is the voltage of the voltage source V1, plus the voltage across the Sziklai pair of transistors. The voltage output cannot rise any higher than that level, since any excess voltage will be clamped by the Sziklai pair.

The clamping circuit further comprises a voltage regulating component in the form of a diode D3$p$, which is connected in series between the positive power input node PPIN and the inductor L1$p$. More specifically, the diode D3$p$ is connected between the second node N2$p$ and a third node N3$p$ corresponding to a first terminal of the inductor L1P, and so the diode D3$p$ is connected in series between the positive power input node PPIN and the third node N3$p$. A second terminal of the inductor L1$p$ is directly connected to the first node N1P.

The diode D3$p$ is forward biased in a direction from the second node N2$p$ to the third node N3$p$, and so conducts in a fully turned on state during the normal operation of the power conditioning circuit 10. This clamps the first terminal of the inductor to a voltage that is lower than the second node by an amount corresponding to the forward conduction voltage of the diode D3$p$. The diode D3$p$ is not required to be high in impedance for the communication signal modulated on the positive power output node PPON, allowing the diode to be a high current capacity type diode. The voltage regulating component could be formed of more than one diode D3$p$, for example connected in series to increase the voltage drop, or in parallel to increase current handling capability.

Due to the diode D3$p$, the voltage at the first node N1$p$ is lower than it would otherwise have been, and so the clamping circuit sees a higher voltage across it than what it otherwise would have done. Therefore, the positive output terminal PPON can be modulated with higher voltage fluctuation before the Sziklai pair begins to clip the voltage, than if the diode D3p were not present. Therefore, the leakage or conductance and therefore signal distortion/attenuation or filtering, is lower due to D3p. This means that smaller or less expensive components can be used in the Sziklai pair, where the required voltage headroom for communication is taken up by the voltage regulating component, which does not affect the communication signal.

The negative side of the circuit also includes a voltage regulating component in the form of the diode D3n, which operates in the same way as D3p to provide a balanced circuit and allow increased voltage fluctuation before the negative-side clamping circuit begins to clip the voltage at node NPON. The diode D3n is connected in series between the negative power input node NPIN and the inductor L1n. More specifically, the diode D3n is connected between the second node N2n and a third node N3n, the third node N3n being a first terminal of the inductor L1n, and so the diode D3n is connected in series between the negative power input node NPIN and the third node N3n. The diode D3n is forward biased in a direction from the third node N3n to the second node N2n, and so conducts in a fully turned on state during the normal operation of the power conditioning circuit 10. A second terminal of the inductor L1n is directly connected to the first node N1n.

Whilst the voltage regulating components in this embodiment are diodes D3p and D3n, which typically provide a fixed voltage drop of around 0.4-0.9V when conducting in a fully turned on state, it will be appreciated that other types of components which regulate a voltage drop between their input and output could alternatively be used. For example, a voltage regulator, such as a series low voltage drop out (LDO) voltage regulator with fixed or adjustable voltage drop.

For operational considerations and a lower source impedance, a capacitor (not shown in FIG. 2, but see Cs of FIG. 6a) may be connected in shunt between the third nodes N3p and N3n. This capacitor helps eliminate any high-frequency conductance issues or parasitic impedance seen with semiconductor devices.

Figure 3:
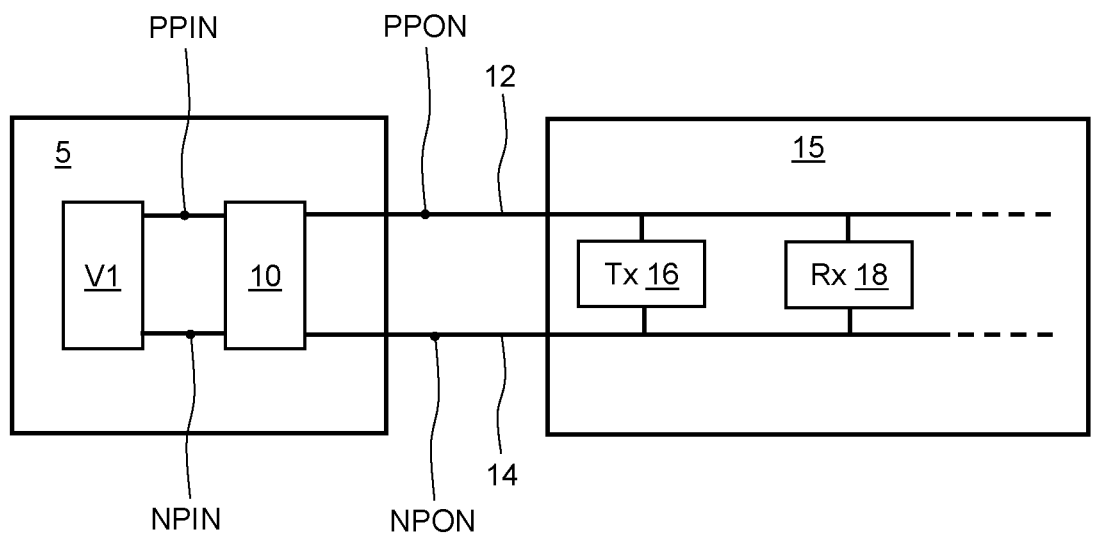
FIG. 3 shows a schematic diagram of a communication system including the power supply system of FIG. 2.

The power conditioning circuit 10 can be incorporated into a power supply system of a communication system, for providing power to devices inside of an explosive environment. An example communication system is shown in FIG. 3, the communication system comprising a power supply system 5, and the power supply system 5 comprising the voltage source V1 and the power conditioning circuit 10 of FIG. 2. The positive and negative output nodes PPON and NPON of the power conditioning circuit are connected to positive and negative conductors 12 and 14 of a communication interface, and supply power thereto. The conductors 12 and 14 extend into an explosive environment 15, and the power conditioning circuit 10 operates to prevent incendive levels of power from being delivered to the conductors 12 and 14 by the power supply V1.

The positive and negative conductors 12 and 14 are connected to a transmitter 16 located inside of the explosive environment 15, and the transmitter 16 modules data symbols onto the positive and negative conductors 12 and 14, which appear as voltage fluctuations in the voltages output by the power conditioning circuit 10 on output nodes PPON and NPON. For example, the power conditioning circuit 10 may output 6V at PPON and −6V at NPON, and the transmitter 16 may modulate those voltages by +/−1V to send data symbols. The inductors L1p, L2p, L1n, L2n in the power conditioning circuit 10 separate the voltage source V1 from PPON and NPON, and allow those fluctuations in voltage to take place. The resistors Rfp and Rfn prevent those inductors from delivering too much power to the conductors 12 and 14, to keep the power delivered within intrinsic safety limits. The transmitter 16 is powered by power drawn from the positive and negative conductors 12 and 14. The transmitter 16 has power circuitry that typically comprises a low frequency filter so that the power can be drawn from the positive and negative conductors 12 and 14 without significantly affecting the relatively higher frequency voltage fluctuations that are modulated onto them.

The positive and negative conductors 12 and 14 are also connected to a receiver 18 located inside of the explosive environment 15, and the receiver 18 is configured to receive and demodulate the voltage fluctuations on the conductors 12 and 14, to receive data sent by the transmitter 16. The receiver 18 is also powered by power drawn from the positive and negative conductors 12 and 14, and has power circuitry comprising a low frequency filter so that the power can be drawn from the positive and negative conductors 12 and 14 without significantly affecting the relatively higher frequency voltage fluctuations that are modulated onto them. The transmitter 16 and receiver 18 could be any types of intrinsically safe device that need to communicate data with one another, and further devices may also be connected to the positive and negative conductors 12 and 14 in further embodiments, as designated by the dotted lines that the positive and negative conductors 12 and 14 terminate with in FIG. 3. For example, there will typically be a terminator device connected across the ends of the positive and negative conductors 12 and 14.

The communication system of FIG. 3 may for example be a FISCO, Fieldbus or 2-wire Ethernet[APL] communication system, complying with intrinsic safety requirements according to IEC 60079-11 (Edition 6, July 2011). The power conditioning circuit 10 is not limited to application in the communication system of FIG. 3, and could alternatively be implemented in other types of communication systems.

A power conditioning circuit 10a according to a second embodiment of the invention will now be described with reference to FIG. 4. If desired then the power conditioning circuit 10a of FIG. 4 could be incorporated in the communication system of FIG. 3, instead of the power conditioning circuit 10. The power conditioning circuit 10a is the same as the power conditioning circuit 10, except for that the Sziklai pairs and protection diodes have been replaced with clamping diodes D2p and D2n in the clamping circuits. The clamping diode D2n is connected in forward bias from the first node N1p to the positive terminal of another voltage source V2, and the clamping diode D2p is connected in forward bias from the negative terminal of the voltage source V2 to the first node N1n. Therefore, in the power conditioning circuit 10a of FIG. 4, the second nodes are nodes N2ap and N2an, which constitute further positive and negative power input nodes of the power conditioning circuit 10a, which are connected to the voltage source V2.

The second nodes N2ap and N2an are fixedly held at higher voltage magnitudes than the third nodes N3p and N3n corresponding to the first terminals of the inductors, by the voltage source V2 outputting a higher voltage than the voltage source V1. For example, in this embodiment the voltage source V1 outputs +6V and −6V to power input nodes PPIN and NPIN, whereas the voltage source V2 outputs +7V and −7V to the further power input nodes (second nodes) N2ap and N2an.

Figure 4:
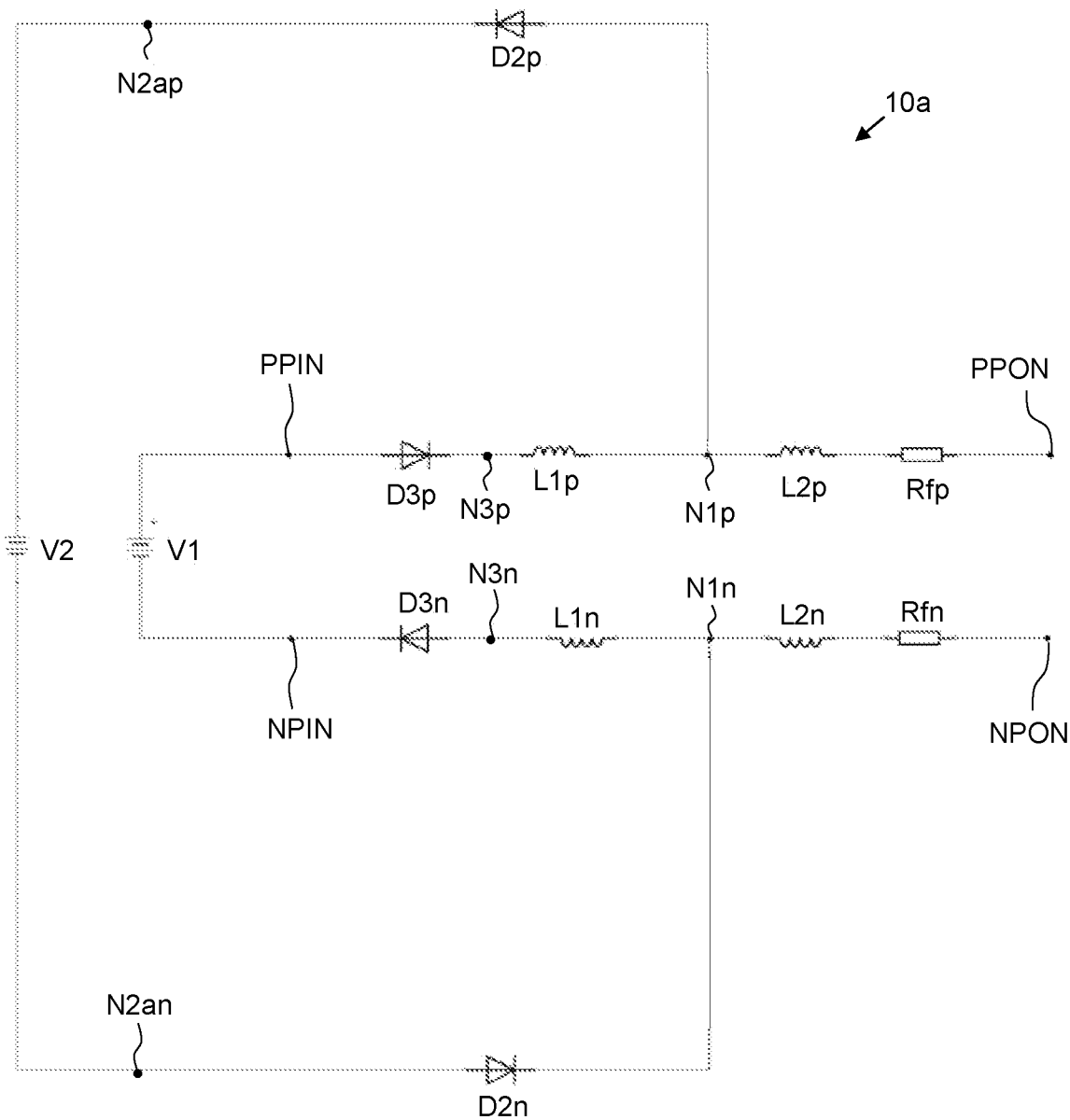
FIG. 4 shows a schematic diagram of a power supply system including a power conditioning circuit in accordance with a second embodiment of the invention.

Whilst in the power conditioning circuit 10 of FIG. 2, the voltage magnitudes at the second nodes are fixed higher than the voltage magnitudes at the third nodes by the voltage regulation components (diodes) D3$p$ and D3$n$, in the power conditioning circuit 10$a$ of FIG. 4 the voltage magnitudes at the second nodes N2$ap$ and N2$an$ are fixed by the voltage source V2. This use of another voltage source V2 to set the greater voltages at the second nodes, rather than relying on the diodes D3$p$ and D3$n$, adds more flexibility to the circuit and allows the conduction of the clamping diodes D2$p$ and D2$n$ of the clamping circuit to be set differently from the other parts of the clamping circuit. The diodes D3$p$ and D3$n$ could now be omitted entirely if desired. It will be appreciated that the voltage source V2 does not supply any power to the circuit, with the diodes D2$p$ and D2$n$ always being reverse biased against any flow of power out of the voltage source V2.

The certification voltage, corresponding to the highest open-loop voltage that can be output from the power conditioning circuit 10$a$ at nodes PPON and NPON, is the voltage of the voltage source V2, plus the forward conduction voltages of D2$p$ and D2$n$. The voltage output cannot rise any higher than that level, since any excess voltage will be clamped by the clamping diodes. The voltage source V2 means that the diodes D2$p$ and D2$n$ do not need to have such a high forward conduction voltage as they do in the embodiment of FIG. 1, and so each may be formed using a single diode (e.g. single PN junction) rather than two or more PN junctions in series with one another. Accordingly, there is less variation in the dynamic impedance of the diodes D2$p$ and D2$n$ compared to the diodes Dc in FIG. 1, and so less distortion is added to the voltage modulated on the positive and negative power output nodes by the communication interface. The voltage V2 is easily set to make sure that the diodes D2$p$ and D2$n$ do not significantly clip any of the voltage modulation.

It is possible to implement some elements of the power conditioning circuits of FIG. 2 and FIG. 4 separately from the other elements, to reduce complexity and improve some aspects of how the power conditioning circuit performs. For example, FIG. 5$a$ shows a power conditioning circuit 10$b$ according to a third embodiment of the invention, which could be incorporated in the communication system of FIG. 3, instead of the power conditioning circuits 10 or 10$a$.

The power conditioning circuit 10$b$ is the same as the power conditioning circuit 10, except for that it lacks the further inductors L2$p$ and L2$n$ and the voltage regulating components (diodes) D3$p$ and D3$n$ of the power conditioning circuit 10. The inductors L1$p$ and L1$n$ can provide sufficient impedance to the voltage fluctuations modulated onto the power output nodes PPON and NPON without the need for the further inductors L2$p$ and L2$n$, and the point at which the Sziklai pairs of transistors turn on can be set high enough by the biasing networks to avoid clipping of the voltage fluctuations modulated onto the power output nodes PPON and NPON, without the need for the voltage regulating components (diodes) D3$p$ and D3$n$ to increase the voltage across the clamping circuits.

As with FIG. 2, the biasing network at the positive side of the circuit is connected in parallel with the inductor L1$p$, and so responds to the voltage across the inductor L1P. Specifically, if the voltage at the first node N1$p$ rises too high, then the biasing network will produce a voltage at the biasing input B$p$ that reaches the turn-on voltage of the transistor T1$p$, causing the transistor T1$p$ to begin to conduct and amplify the base current through the emitter-collector junction. This current is taken from the base of the transistor T2$p$, which has no biasing or input current limiting, and it is again further amplified, and therefore, due to the high base current demanded by the input transistor T1$p$, the follower transistor T2$p$ will very rapidly conduct, and again, amplify the current such that the follower transistor's emitter-collector current will be typically 400 to 2,000 times the base current at the input transistor T1$p$. This high follower transistor current effectively places a short circuit across the inductor L1$p$, which in turn, rapidly decreases the voltage across the inductor, and therefore the circuit, which will then cease to function once the voltage at the first node N1$p$ has sufficiently reduced.

In some systems, this could lead to oscillation if the inductor L1$p$ has not fully discharged or the circuit reaction time is too slow, or the propagation delay is too long, however, the system, due to its fast speed, will reach an equilibrium at the very least, which will always be at a fixed voltage governed by the transistor arrangement T1$p$ and T2$p$ and biasing. In effect, the circuit is similar to a 'crowbar' in terms of its fast 'avalanche' clamping and its current gain, with the only difference being that it is self-resetting, less prone to temperature variations, has a lower voltage threshold in most cases and it clamps to a specific voltage, and not lower. It could be argued that this resembles a more ideal Zener Diode, in its reverse breakdown mode.

Figure 5B:
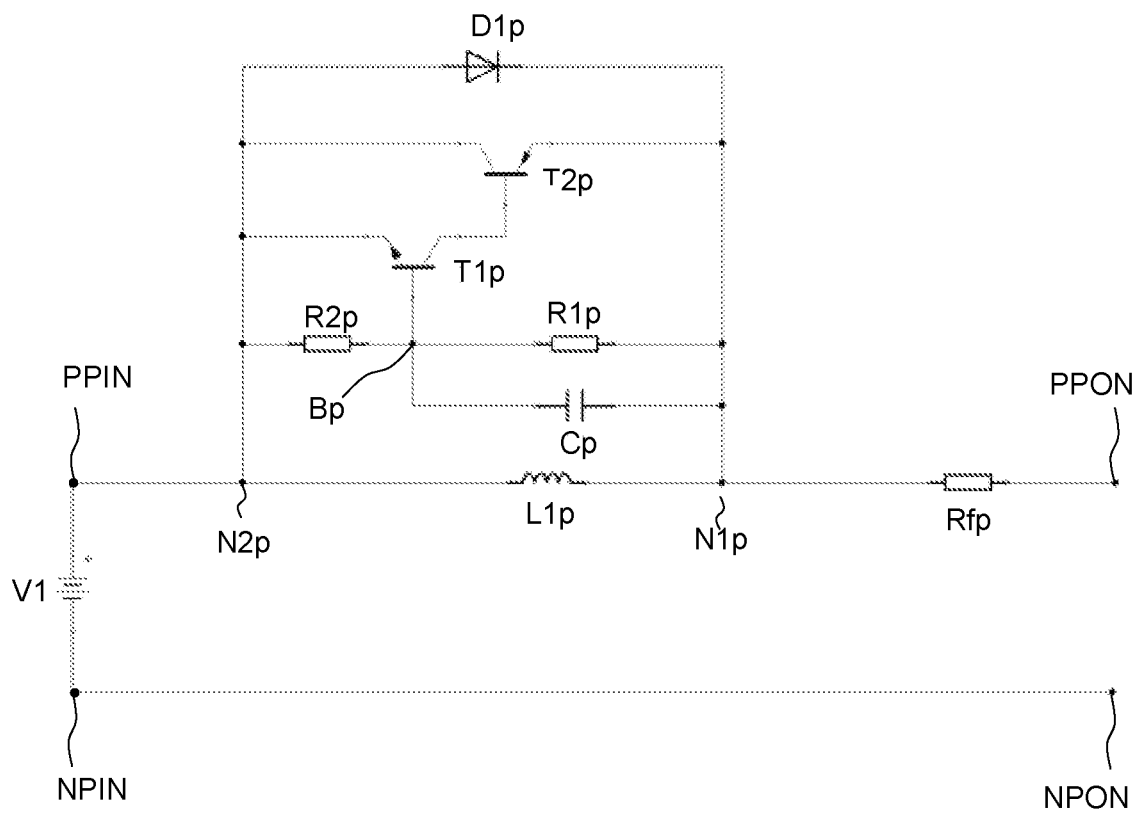
Figure 5A:
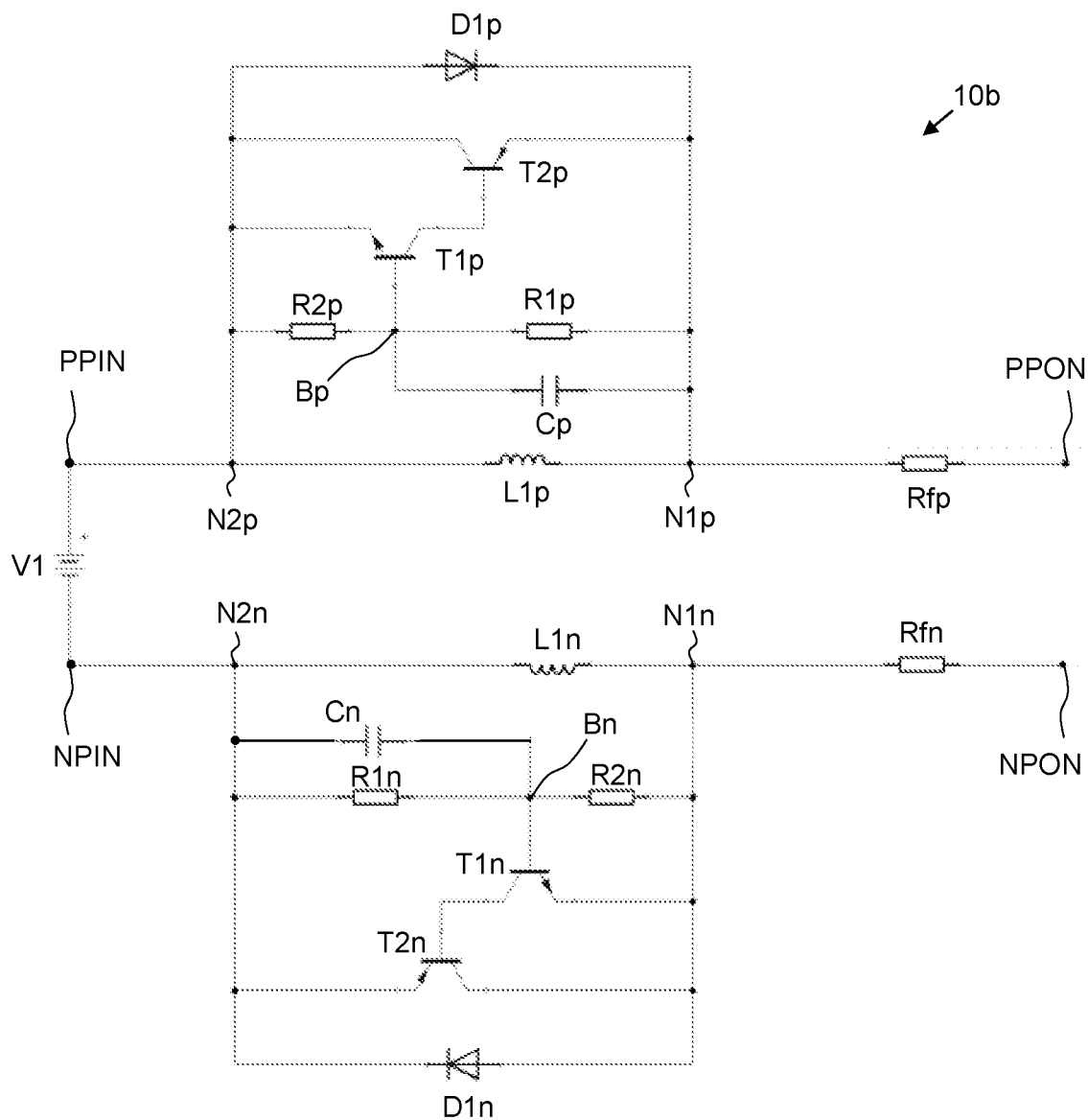
FIG. 5a shows a schematic diagram of a power supply system including a power conditioning circuit in accordance with a third embodiment of the invention.

As with the power conditioning circuits 10 and 10$a$, the power conditioning circuit 10$b$ could be implemented as a single-ended circuit that only performs power conditioning in the positive half of the circuit, with the negative half of the circuit simply being a ground or 0V line. An example of this is shown in FIG. 5$b$.

FIG. 6$a$ shows a power conditioning circuit 10$c$ according to a fourth embodiment of the invention, which could be incorporated in the communication system of FIG. 3, instead of the power conditioning circuits 10, 10$a$, or 10$b$.

The power conditioning circuit 10$c$ is the same as the power conditioning circuit 10, except for that it lacks the protection diodes D1$p$ and D1$n$, the further inductors L2$p$ and L2$n$, and has the clamping diodes D2$p$ and D2$n$ instead of the Sziklai pairs of transistors T1$p$, T2$p$, T1$n$, and T2$n$ of the power conditioning circuit 10. The clamping diodes D2$p$ and D2$n$ can sufficiently clamp excess voltage at the first nodes N1$p$ and N1$n$ during an open-circuit fault without the need for the protection diodes D1$p$ and D1$n$ to reduce the energy stored in the inductors L1$p$ and L1$n$ during an immediately preceding short-circuit fault. The inductors L1$p$ and L1$n$ can provide sufficient impedance to the voltage fluctuations modulated onto the power output nodes PPON and NPON without the need for the further inductors L2$p$ and L2$n$.

The clamping diodes D2$p$ and D2$n$ can perform sufficient voltage clamping at the first nodes N1$p$ and N1$n$ without the need for the Sziklai pairs of transistors T1$p$, T2$p$, T1$n$, T2$n$, particularly because the voltage regulating components (diodes) D3$p$ and D3$n$ are still present, which increase the voltage across the clamping diodes D2$p$ and D2$n$ in the reverse-bias direction, and so reduce any clipping of the voltage fluctuations modulated onto the power output nodes PPON and NPON.

As with the power conditioning circuits 10 and 10$a$, the power conditioning circuit 10$c$ has the diode D3$p$ used in series between the positive power input node PPIN and the inductor L1$p$ in a forward biased (conducting) orientation, thus dropping a given voltage, at a given current (the current used to power the load). The diode D3$p$ is not required to be high in impedance for the communication signal since the communication signal is filtered by the inductor L1$p$, allowing the diode to be a high current capacity type diode. The inductor L1p is protected by the clamping diode D2p, which may be a signal or low power standard rectifier diode, which spans from the output of the inductor L1p at the first node N1p, back to the clamped voltage source V1.

The use of the voltage regulating components (diodes) D3p and D3n means that only one PN junction is needed for each of the diodes D2p and D2n, giving a reduced certification voltage and smaller resistors Rfp and Rfn, whilst still avoiding clipping of the voltage fluctuations modulated onto the power output nodes PPON and NPON.

Figure 6A:
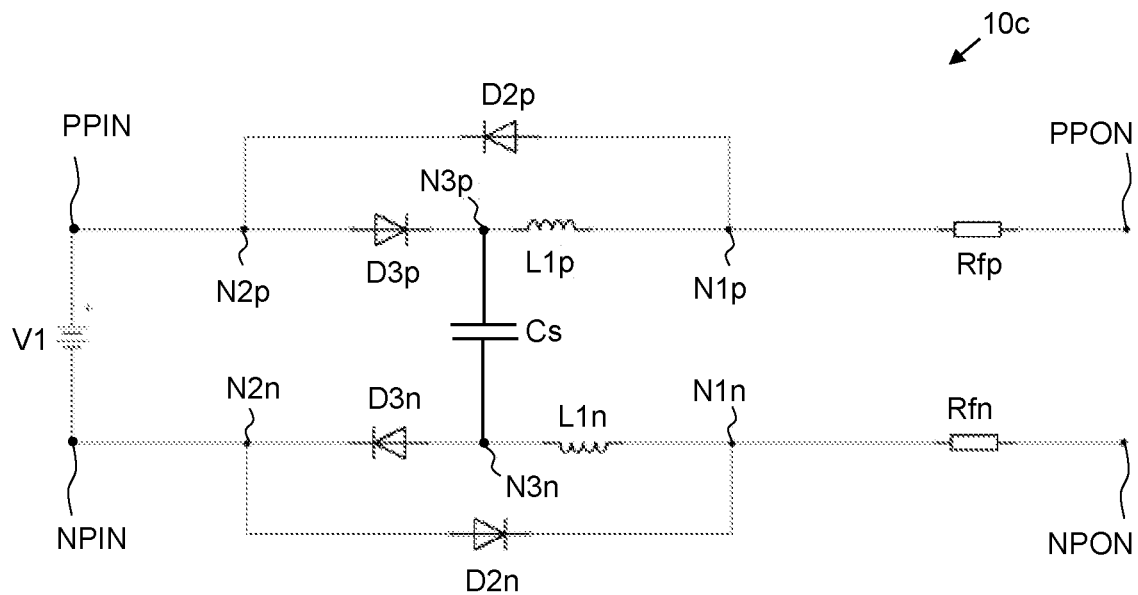
FIG. 6a shows a schematic diagram of a power supply system including a power conditioning circuit in accordance with a fourth embodiment of the invention.

For operational considerations and a lower source impedance, an optional capacitor Cs is connected in shunt between the third nodes N3p and N3n at the first terminals of the inductors, as shown in FIG. 6a. This capacitor helps eliminate any high-frequency conductance issues or parasitic impedance seen with semiconductor devices.

Figure 6B:
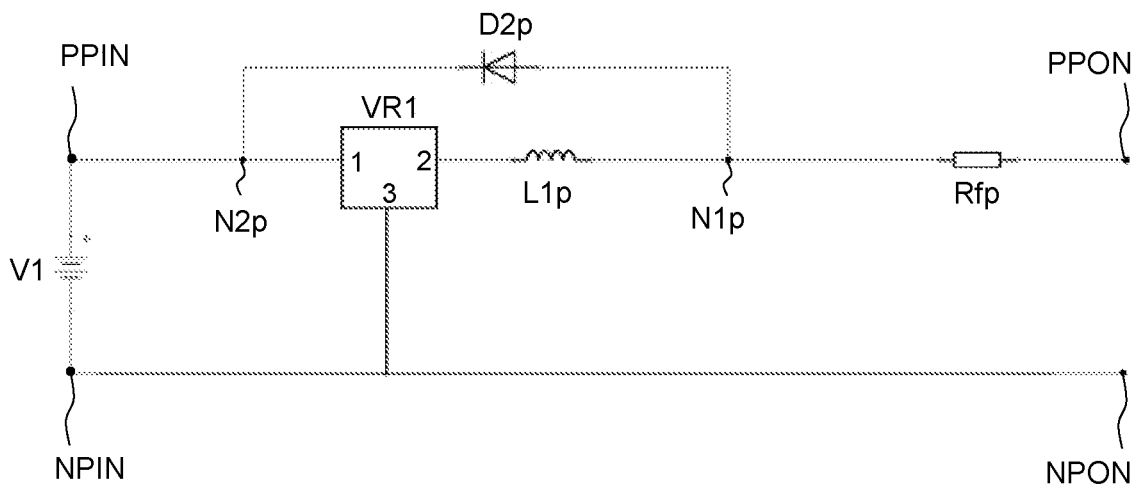

As with the power conditioning circuits 10, 10a and 10b, the power conditioning circuit 10c could be implemented as a single-ended circuit that only performs power conditioning in the positive half of the circuit, with the negative half of the circuit simply being a ground or 0V line. An example of this is shown in FIG. 6b. FIG. 6b also shows how the voltage regulating diode D3p can be replaced by a series low voltage drop out (LDO) voltage regulator VR1 if desired. The voltage regulator VR1 has a first terminal 1 connected to the second node N2P, a second terminal 2 connected to the first terminal of the inductor, and a third terminal 3 connected to the negative power input node NPIN. The voltage regulator regulates the voltage drop from terminal 1 to terminal 2. Two such voltage regulators could also be used to replace the two diodes D3p and D3n in FIG. 6a.

The system is 'fail-safe' with any fault on D3p or VR1, and a short-circuit fault would simply result in more clipping of the voltage fluctuations modulated on PPON and NPON. The diodes D2p and D2n can also be made fail-safe, by including more than one PN junction connected in parallel for each diode so that if one PN junction fails the others still remain.

In both FIGS. 6a and 6b circuits, the clamping diode D2p sees a larger reverse bias voltage compared to if the voltage regulating component D3p or VR1 were not present, such that when communicating, the leakage or conductance and therefore signal distortion/attenuation or filtering, is lower. This means that smaller or less expensive clamping diodes can be used, where the required voltage headroom for communication is taken up by the series forward biased diode D3p or voltage regulator VR1, which do not affect the communication signal.

For an over voltage situation, during back-emf of the inductor L1p as may occur during an open circuit fault between PPON and NPON, the clamping diodes D2p will conduct and shunt the current to the clamped voltage source V1, maintaining the final certification voltage for the circuit, upstream of the current limiting resistors Rfp and Rfn (when present). For any 'let-through' energy, this can be tested or assessed in accordance with Annex E of IEC60079 Part 11, which is used to determine the permitted transient according to Annex A.

Figure 7A:
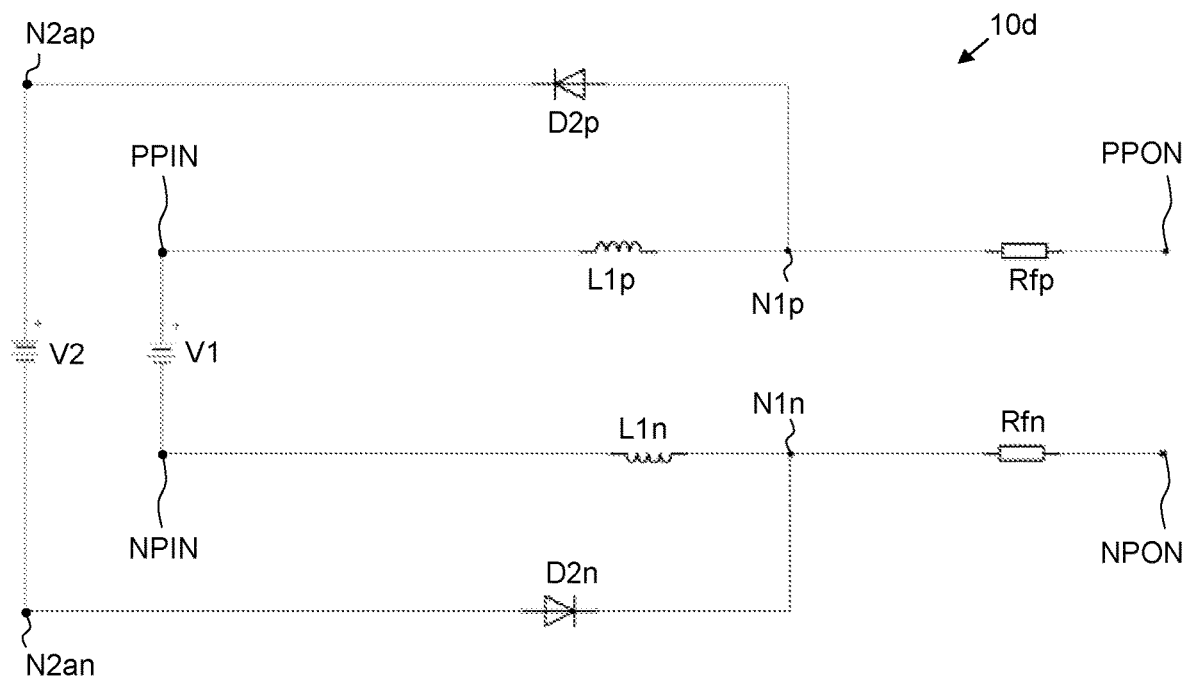
FIG. 7a shows a schematic diagram of a power supply system including a power conditioning circuit in accordance with a fifth embodiment of the invention.

FIG. 7a shows a power conditioning circuit 10d according to a fifth embodiment of the invention, which could be incorporated in the communication system of FIG. 2, instead of the power conditioning circuits 10, 10a, 10b, or 10c. The power conditioning circuit 10d is the same as the power conditioning circuit 10a, except for that it lacks the voltage regulating components (diodes) D3p and D3n and the further inductors L2p and L2n.

The clamping diodes D2p and D2n can perform sufficient voltage clamping at the first nodes N1p and N1n without the need for the voltage regulating components (diodes) D3p and D3n, particularly because the voltage source V2 connected to the second nodes N2ap and N2an is still present, which increases the voltage across the clamping diodes D2p and D2n in the reverse-bias direction, and so reduces any clipping of the voltage fluctuations modulated onto the power output nodes PPON and NPON.

The inductors L1p and L1n can provide sufficient impedance to the voltage fluctuations modulated onto the power output nodes PPON and NPON without the need for the further inductors L2p and L2n.

Figure 1:
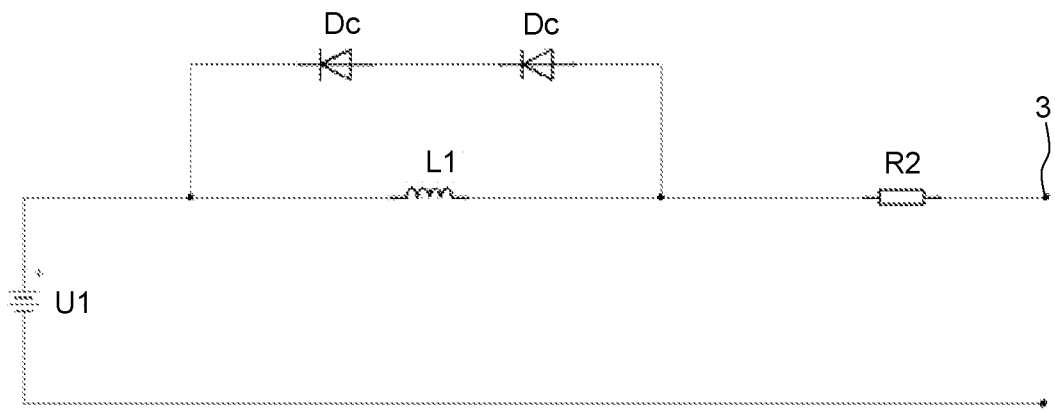
FIG. 1 shows a schematic diagram of a power supply system not forming part of the present invention.

Therefore, the use of the voltage source V2 means that only one PN junction is needed for each of the diodes D2p and D2n, giving a reduced certification voltage compared to the circuit of FIG. 1. The result is that lower resistance values for Rfn or Rfn can be used, and/or a greater headroom can be given for the communication signals (voltage fluctuations modulated onto the power output nodes PPON and NPON can be greater before significant clipping occurs), and/or a higher bulk source voltage V1 can be achieved, and/or longer cable lengths can be realised and/or better signal integrity can be attained, with lower signal attenuation and/or distortion.

As is also the case in the power conditioning circuit 10a, the voltage source V2 may be formed by a clamped voltage reference circuit, designed to only deal with signal level currents and/or back-emf transients, and designed to be high in impedance. The voltage source V2 must curtail incendive-potential transients delivered to it through the diodes D2p and D2n, and not be affected by continual transients (at high repetitive frequencies) due to the voltage fluctuations modulated onto the output nodes PPON and NPON by subsequent circuitry.

The voltage source V2 may comprise a fixed or adjustable reference diode, driving a bipolar transistor follower, in order to increase the current capability. This clamping reference may be floating as shown in FIG. 7a, but is preferably tied centrally (bi-polar), or at one pole to a ground point, e.g. the bulk supply 0V line or plane, so that any inductor-resistor unbalance does not lead to an unbalance of the back-emf voltage peaks. The voltage source V2 may comprise a negative and a positive clamping circuit when tied to a specific grounding/common point with respect to V1. In this case, any back-emf and/or over-voltage signals would now be 'shunted' into the voltage source V2, which is more precisely known and stable under varying/various currents in comparison to diodes, when the voltage of V2 is above the voltage of V1 to reduce any clipping of the voltage fluctuations modulated onto the power output nodes PPON and NPON.

The diodes D2p and D2n can also be made fail-safe, by including more than one PN junction connected in parallel for each diode so that if one PN junction fails the others still remain. The voltage source V2 may also be duplicated, or triplicated for infallibility, with infallible PCB traces or wires linking all critical paths together. The resistors Rfp and Rfn are infallible resistors that present at least their rated resistance, even under failure.

Figure 7B:
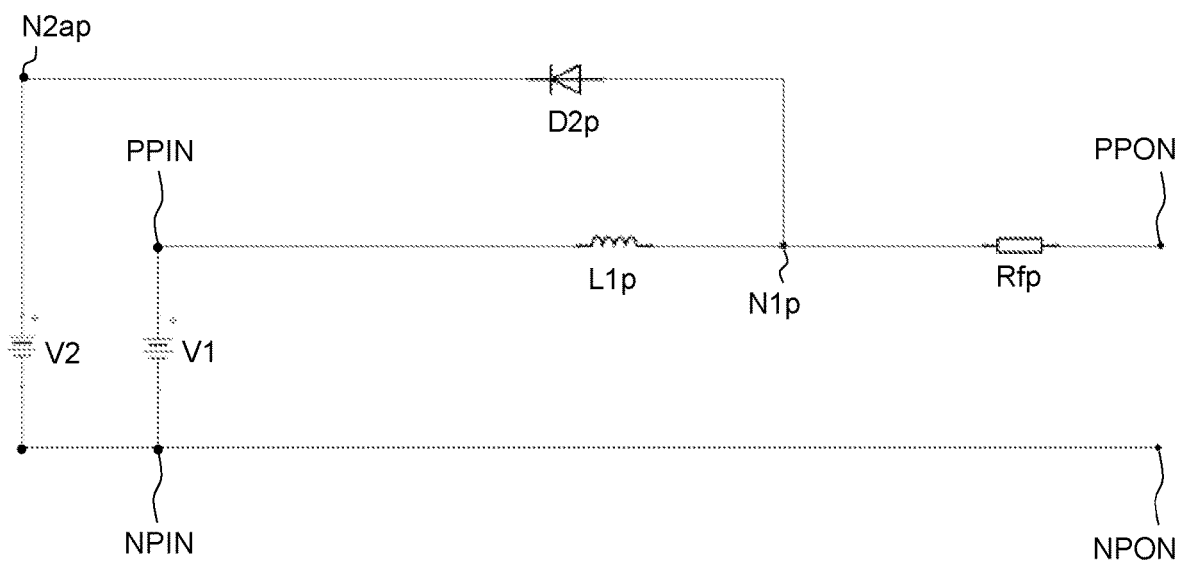

As with the power conditioning circuits 10, 10a, 10b and 10c, the power conditioning circuit 10d could be implemented as a single-ended circuit that only performs power conditioning in the positive half of the circuit, with the negative half of the circuit simply being a ground or 0V line. An example of this is shown in FIG. 7b.

Figure 8A:
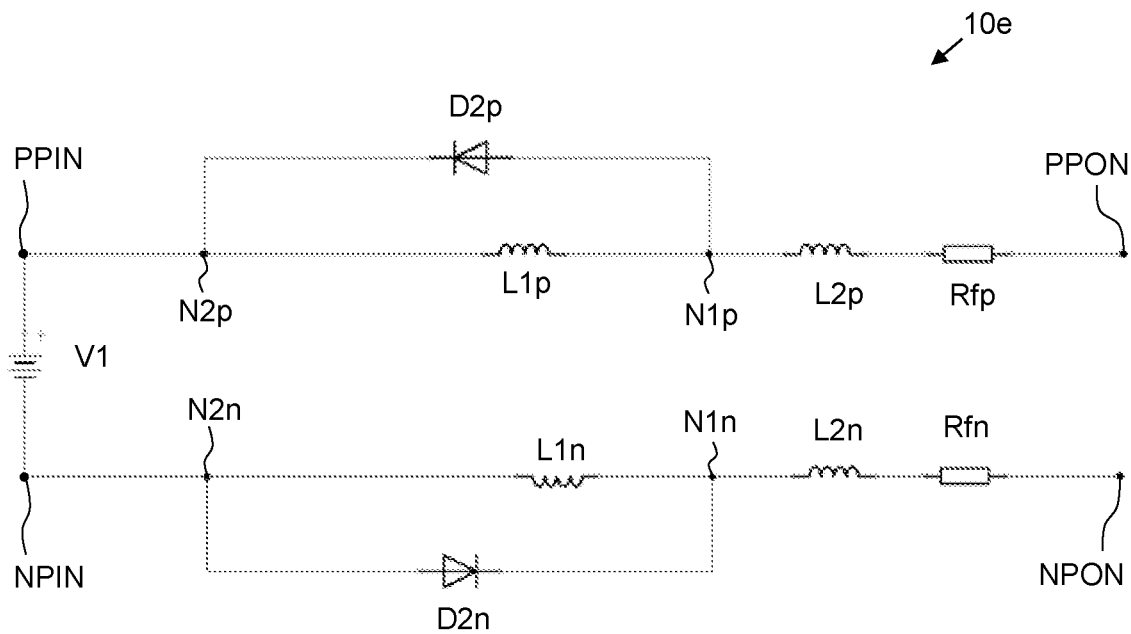
FIG. 8a shows a schematic diagram of a power supply system including a power conditioning circuit in accordance with a sixth embodiment of the invention.

FIG. 8a shows a power conditioning circuit 10e according to a sixth embodiment of the invention, which could be incorporated in the communication system of FIG. 3, instead of the power conditioning circuits 10, 10a, 10b, 10c, or 10d. The power conditioning circuit 10e is the same as the power conditioning circuit 10, except for that the power conditioning circuit 10e lacks the protection diodes D1p and D1n, the voltage regulating components (diodes) D3p and D3n, and the Sziklai pairs of transistors T1p, T2p, T1n, and T2n of the power conditioning circuit 10. The clamping diodes D2p and D2n can sufficiently clamp excess voltage at the first nodes N1p and N1n during an open-circuit fault without the need for the protection diodes D1p and D1n to reduce the energy stored in the inductors L1p and L1n during an immediately preceding short-circuit fault.

The clamping diodes D2p and D2n can perform sufficient voltage clamping at the first nodes N1p and N1n without the need for the Sziklai pairs of transistors T1p, T2p, T1n, T2n, nor the voltage regulating components (diodes) D3p and D3n, particularly because the further inductors L2p and L2n are still present, which reduce the voltage fluctuations at the first nodes N1p and N1n, and so make clipping of the voltage fluctuations modulated onto the output nodes PPON and NPON by subsequent circuitry less likely to occur. The further inductors L2p and L2n also mean that the inductors L1p and L1n can have lower inductances, therefore injecting less energy into the circuit in the event of an open circuit fault.

The power conditioning circuit of FIG. 8a comprises two series inductive impedances used for signal/data modulation isolation. The first inductive impedance L1p comprises a high inductance inductor that is outside the safe design limits of IEC60079 Part 11, Annex A, (Edition 6, July 2011), and therefore requires voltage clamping or other voltage protection means. The second inductive impedance L2p downstream of the first inductor L1p from the voltage source V1 is within the safe design limits of IEC60079 Part 11 Annex A, (Edition 6, July 2011), for a given voltage and current, and therefore requires no voltage clamping or protection means. The first inductor L1p is used for the lower frequency components of the modulating signal, and the second inductor L2p is used for the higher frequency components of the modulating signal. The first inductor L1p is safely voltage clamped by a low impedance voltage clamp arrangement (clamping diode D2p), with an impedance that is high enough not affect the lower frequency spectrum of the signal.

In FIG. 8a, the circuit is balanced, with each series element equally distributed in both the positive and negative lines. Also, each component may comprise one or more components arranged in series and/or in parallel for operational and/or certification reasons. The certification voltage is the voltage V1 added to the forward conduction voltages of diodes D2p and D2n. The modulation impedance is provided by inductors L1p, L1n, L2p, and L1n in combination. The current is limited by infallible resistances Rfp and Rfn, sized to satisfy Table A.1 of IEC60079 Part 11, (Edition 6, July 2011). Clamping diode D2p is used to clamp the voltage of inductor L1p, and clamping diode D2n is used to clamp the voltage of inductor L1n, so that their inductances can be discounted for IEC60079 Part 11 (Edition 6, July 2011) assessment.

As with the power conditioning circuits 10, 10a, 10b, 10c and 10d, the power conditioning circuit 10e could be implemented as a single-ended circuit that only performs power conditioning in the positive half of the circuit, with the negative half of the circuit simply being a ground or 0V line.

Figure 8B:
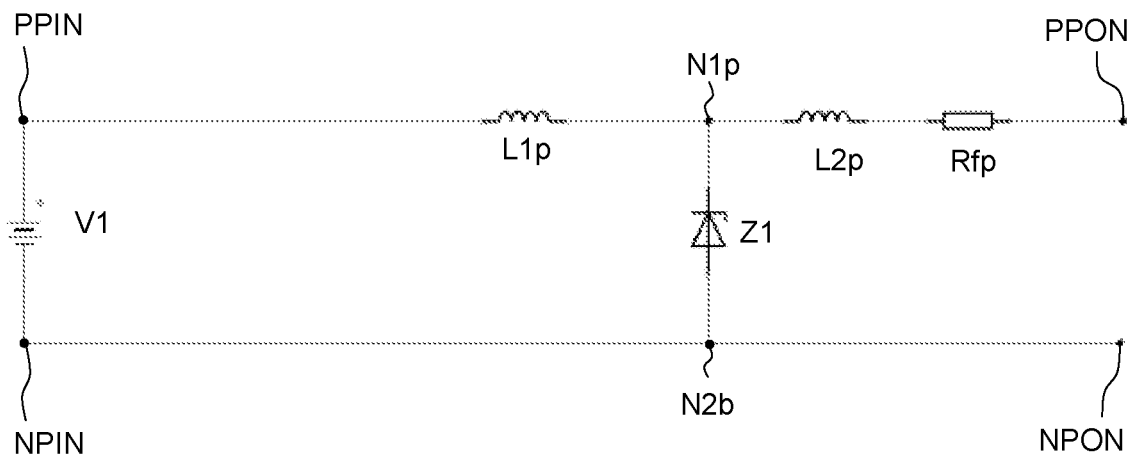

An example of this is shown in FIG. 8b, together with an additional optional modification of the clamping circuit to use a Zener diode instead of the diode D2p.

Specifically, since the first inductor L1p is only used for isolating the lower frequency components of the modulating signal from the voltage source V1, with the higher frequency components of the modulating signal being isolated by the further inductor Rfn, the clamping circuit across the first inductor L1p can take any form. In FIG. 8b, the clamping circuit is a Zener diode Z1, which replaces diode D2p of FIG. 8a. In this case, the certification voltage will be based on the voltage of Zener diode Z1, and the inductance of L1 can be ignored. The Zener diode Z1 is connected in shunt between the first node N1p and a second node N2b, the second node N2b being between the negative power input and negative power output nodes NPIN and NPON.

Whilst the above embodiments all incorporate the resistors Rfp and Rfn to reduce currents, in alternate embodiments these resistors could be omitted.

Figure 9:
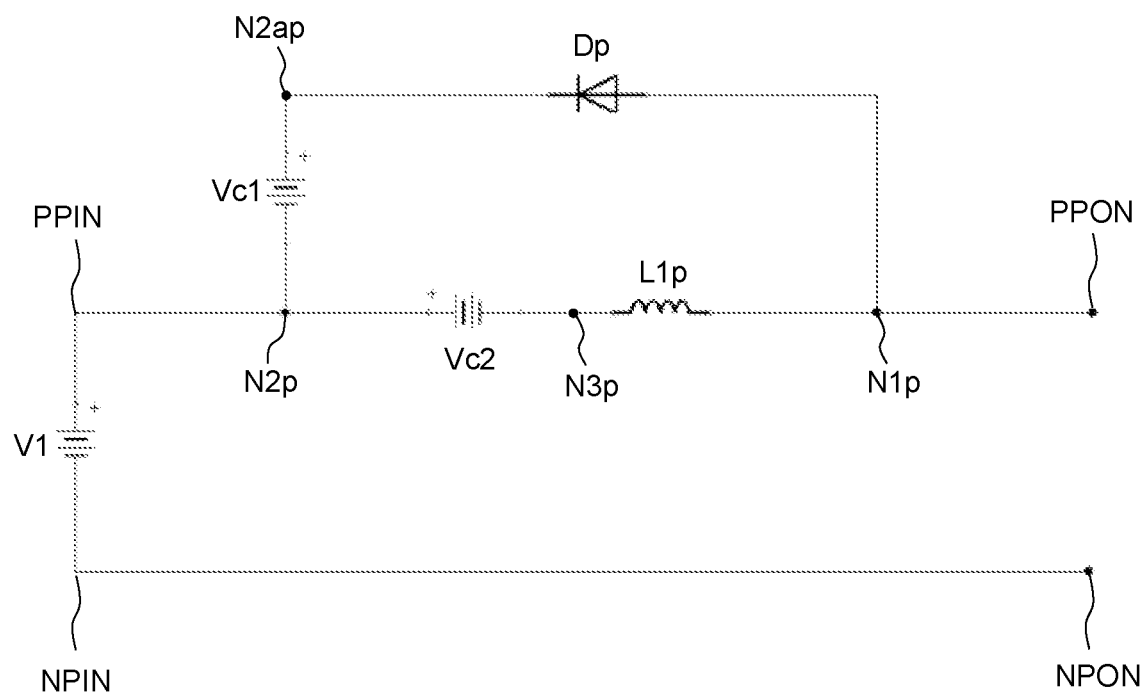
FIG. 9 shows an equivalent circuit corresponding to the first, second, fourth and fifth embodiments of the invention.

The schematic diagram of FIG. 9 shows an equivalent circuit that summarises the principles of how the second node to which the clamping circuit is connected can be held at a higher voltage than the first terminal of the inductor, in accordance with the power conditioning circuits 10, 10a, 10c, or 10d. The equivalent circuit is single ended, but could be made balanced by duplicating the components in the positive half of the circuit into the negative half.

The equivalent circuit comprises the inductor L1p connected in series between the positive power input and input nodes PPIN and PPON, and an ideal diode function Dp connected in parallel with the inductor. Since the diode function Dp is ideal, it does not have any forward voltage drop when conducting, and so the forward voltage drop across the diode is represented by a contribution to the voltage Vc1. The voltage Vc1 appears in series with the diode function Dp, and in parallel with the inductor L1p, therefore connecting from the positive power input terminal PPIN to the second node N2ap, and the ideal diode function Dp. The ideal diode function Dp may for example be implemented as the clamping diode D2p, or as the Sziklai pair of transistors T1p and T2p and their associated biasing network, in the same manners as described further above.

The voltage Vc1 may also be contributed to by the voltage V2, which raises the voltage of the second node N2ap above the voltage of the positive power input node PPIN, for example as seen in FIG. 4.

The voltage Vc2 corresponds to the voltage drop across the diode D3p (in the case of FIGS. 2, 4, and 6a) or across the voltage regulator VR1 (in the case of FIG. 6a).

Accordingly, the voltage at the second node N2ap will be higher than the voltage at the third node N3p corresponding to the first terminal of the inductor, by an amount equal to Vc1+Vc2. In various embodiments, the voltages of Vc1 and Vc2 may vary, and one of those two voltages may even be zero when the corresponding circuit components are omitted. But, the voltages Vc1 and Vc2 together sum to a voltage that is higher than the positive peak of the voltage modulation applied to the positive power output node PPON, and so the voltage modulation will not be clipped by the diode function Dp. The certification voltage as the maximum open-loop voltage will be V1+Vc1.

If the voltage Vc1 was effectively zero, or in other words just a conductor, for example by omitting the voltage source V2 and using circuitry producing a diode function Dp with no forward voltage drop, then the second node N2ap effectively becomes the same node as N2p.

Further embodiments implementing the equivalent circuit of FIG. 9, in which the second node connected to the diode function of the clamping circuit is fixed at a higher voltage than the first terminal of the inductor, will also be apparent to those skilled in the art.

Many other variations of the described embodiments falling within the scope of the invention will be apparent to those skilled in the art. For example, it will be appreciated that the embodiments described herein may be modified with additional impedances of different forms (not shown), for example, resistive, capacitive and/or inductive impedances, positioned at required points across the positive and negative sides of the circuits and/or across components, anywhere around the circuit, in order to prevent instability, resonances or to adequately shape, or reshape the signal/waveform.

What is claimed is:

1. A power conditioning circuit comprising:
a positive power input node and a negative power input node for connecting to a positive output and a negative output of a power supply;
a positive power output node and a negative power output node for connecting to a positive line and a negative line of a communication interface;
an inductor connected in series between the positive power input node and the positive power output node, the inductor comprising a first terminal connected to the positive power input node and a second terminal connected to the positive power output node, the inductor allowing a voltage at the positive power output node to be modulated by data that is sent through the communication interface;
a first node between the second terminal of the inductor and the positive power output node; and
a clamping circuit connected at the first node to a second node, the clamping circuit is configured to clamp a voltage increase across the inductor to less than a maximum increase, and the second node is configured to be continuously held at a voltage higher than the voltage of the first terminal of the inductor.

2. The power conditioning circuit of claim 1, wherein the second node is a further positive power input node for connecting to a power supply output of a higher voltage than the voltage connected to the positive power input node.

3. The power conditioning circuit of claim 1, further comprising a further inductor connected in series between the first node and the positive power output node, the further inductor has a lower inductance than the inductor.

4. The power conditioning circuit of claim 1, wherein the clamping circuit comprises a clamping diode connected in parallel with the inductor between the positive power input node and the first node, the clamping diode being connected in forward bias in a direction from the first node to the positive power input node.

5. The power conditioning circuit of claim 1, wherein the clamping circuit comprises a pair of transistors that are connected in parallel with the inductor between the positive power input node and the first node, the pair of transistors being in either a Sziklai or Darlington configuration, a biasing input of the pair of transistors is connected to the first node via a biasing network, the biasing network comprises a voltage divider of at least two resistors connected in series with one another, the voltage divider being connected in parallel with the inductor, and the biasing input of the pair of transistors is connected at a node between the resistors of the at least two resistors.

6. The power conditioning circuit of claim 5, wherein the at least two resistors of the biasing network comprise resistors having temperature coefficients that compensate for temperature variations so that the voltage across the inductor that is required for the pair of transistors to turn on will remain substantially constant as a temperature of the clamping circuit varies.

7. The power conditioning circuit of claim 5, wherein the biasing network comprises a capacitor that connects the biasing input of the pair of transistors to the first node.

8. The power conditioning circuit of claim 1, wherein the second node is the positive power input node and the clamping circuit further comprises a voltage regulating component that is connected in series between the positive power input node and the first terminal of the inductor.

9. The power conditioning circuit of claim 8, wherein the voltage regulating component is a diode connected in forward bias in a direction from the positive power input node to the first terminal of the inductor.

10. The power conditioning circuit of claim 1, wherein the clamping circuit is configured to implement a diode function that is forwardly biased in a direction from the first node to the second node.

11. The power conditioning circuit of claim 1, wherein the inductor is a first inductor, and the power conditioning circuit further comprises a second inductor connected in series between the negative power input node and the negative power output node, the second inductor comprising a first terminal connected to the negative power input node and a second terminal connected to the negative power output node, the second inductor allowing a voltage at the negative power output node to be modulated by data sent through the communication interface.

12. The power conditioning circuit of claim 11, wherein the first inductor and the second inductor are each defined by coil windings, the coil windings of the first inductor and the coil windings of the second inductor are both wound around a same core as one another.

13. The power conditioning circuit of claim 11, further comprising a first negative node between the second inductor and the negative power output node, and a second clamping circuit connected at the first negative node to a second negative node, the second clamping circuit is configured to clamp a voltage decrease across the second inductor to less than a maximum decrease, and the second negative node is configured to be continuously held at a voltage lower than the first terminal of the second inductor.

14. The power conditioning circuit of claim 13, further comprising a further second inductor connected in series between the first negative node and the negative power output node, the further second inductor has a lower inductance than the second inductor.

15. A power supply system comprising:
a first power supply;
a second power supply having a higher output voltage than the first power supply; and
a power conditioning circuit comprising:
a positive power input node and a negative power input node for connecting to a positive output and a negative output of the first power supply;
a positive power output node and a negative power output node for connecting to a positive line and a negative line of a communication interface;
an inductor connected in series between the positive power input node and the positive power output node, the inductor comprising a first terminal connected to the positive power input node and a second terminal connected to the positive power output node, the inductor allowing a voltage at the positive power output node to be modulated by data that is sent through the communication interface;
a first node between the second terminal of the inductor and the positive power output node; and
a clamping circuit connected at the first node to a second node, the clamping circuit is configured to clamp a voltage increase across the inductor to less than a maximum increase, and the second node is configured to be continuously held at a voltage higher than the voltage of the first terminal of the inductor, the second node is connected to a power supply output of the second power supply having the higher output voltage than the voltage of the first power supply connected to the positive power input node.

16. A power supply system comprising:
a first power supply having a positive output and a negative output;
a second power supply having a further positive output and a further negative output; and
a power conditioning circuit comprising:
a positive power input node and a negative power input node for connecting to a positive output and a negative output of the first power supply;
a positive power output node and a negative power output node for connecting to a positive line and a negative line of a communication interface;
a first inductor connected in series between the positive power input node and the positive power output node, the first inductor comprising a first terminal connected to the positive power input node and a second terminal connected to the positive power output node, the first inductor allowing a voltage at the positive power output node to be modulated by data that is sent through the communication interface;
a first node between the second terminal of the first inductor and the positive power put node;
a first clamping circuit connected at the first node to a second node, the first clamping circuit is configured to clamp a voltage increase across the first inductor to less than a maximum increase, and the second node is configured to be continuously held at a voltage higher than the voltage of the first terminal of the first inductor;
a second inductor connected in series between the negative power input node and the negative power output node, the second inductor comprising a first terminal connected to the negative power input node and a second terminal connected to the negative power output node, the second inductor allowing a voltage at the negative power output node to be modulated by data sent through the communication interface;
a first negative node between the second inductor and the negative power output node; and
a second clamping circuit connected at the first negative node to a second negative node, the second clamping circuit is configured to clamp a voltage decrease across the second inductor to less than a maximum decrease, and the second negative node is configured to be continuously held at a voltage lower than the first terminal of the second inductor, the second node is connected to the further positive output of the second power supply, the further negative output of the second power supply is connected to the second negative node, the further positive output of the second power supply is configured to output a higher voltage than the positive output of the first power supply, and the further negative output of the second power supply is configured to output a lower voltage than the negative output of the first power supply.

17. A communication system comprising:
a power supply system comprising a power supply and a power conditioning circuit, the power conditioning circuit comprising:
a positive power input node and a negative power input node for connecting to a positive output and a negative output of the power supply;
a positive power output node and a negative power output node for connecting to a positive line and a negative line of a communication interface;
an inductor connected in series between the positive power input node and the positive power output node, the inductor comprising a first terminal connected to the positive power input node and a second terminal connected to the positive power output node, the inductor allowing a voltage at the positive power output node to be modulated by data that is sent through the communication interface;
a first node between the second terminal of the inductor and the positive power output node; and
a clamping circuit connected at the first node to a second node, the clamping circuit is configured to clamp a voltage increase across the inductor to less than a maximum increase, and the second node is configured to be continuously held at a voltage higher than the voltage of the first terminal of the inductor;
a communication interface having a positive line and a negative line connected to the positive power output node and the negative power output node of the power conditioning circuit, respectively; and
a transmitter connected to the positive line and the negative line of the communication interface, the transmitter configured to transmit data symbols by modulating voltages of the positive line and the negative line of the communication interface.

18. The communication system of claim 17, further comprising a receiver connected to the positive line and the negative line of the communication interface, the receiver is configured to draw power from the positive line and the negative line of the communication interface to power the receiver to decode the data symbols transmitted on the communication interface by the transmitter.

19. A power conditioning circuit comprising:
a positive power input node and a negative power input node for connecting to a positive output and a negative output of a power supply;
a positive power output node and a negative power output node for connecting to a positive line and a negative line of a communication interface;
an inductor and a further inductor connected in series with one another between the positive power input node and the positive power output node;
a first node at the series connection between the inductors, the inductor connected between the positive power input node and the first node, and the further inductor connected between the first node and the positive power output node; and a clamping circuit connected to the first node and configured to clamp a voltage increase across the inductor to less than a maximum increase, the further inductor has a lower inductance than the inductor and the further inductor remains undamped.

* * * * *